(12) United States Patent
Uschitsky et al.

(10) Patent No.: US 6,454,465 B1
(45) Date of Patent: Sep. 24, 2002

(54) METHOD OF MAKING AN OPTICAL FIBER COLLIMATING DEVICE

(75) Inventors: Michael Uschitsky, Irvine, CA (US); Scott M. Hellman, Garden Grove, CA (US); David A. Thompson, Horseheads, NY (US); Kurt R. Francis, Yuma, AZ (US)

(73) Assignee: Corning Incorporated, Corning, NY (US)

( * ) Notice: Subject to any disclaimer, the term of this patent is extended or adjusted under 35 U.S.C. 154(b) by 172 days.

(21) Appl. No.: 09/660,641

(22) Filed: Sep. 13, 2000

Related U.S. Application Data
(60) Provisional application No. 60/193,712, filed on Mar. 31, 2000.

(51) Int. Cl.[7] ............................. G02B 6/26; G02B 6/36; G02B 6/38
(52) U.S. Cl. ............................. 385/79; 385/34; 385/47; 385/61; 385/65; 385/83
(58) Field of Search ............................. 385/15, 24, 27, 385/31, 33, 34, 46–48, 60, 61, 65, 78, 79, 83

(56) References Cited

U.S. PATENT DOCUMENTS

| | | | |
|---|---|---|---|
| 4,509,827 A | * | 4/1985 | Cowen et al. ............ 385/79 X |
| 4,637,683 A | * | 1/1987 | Asawa ..................... 385/79 X |
| 5,652,814 A | | 7/1997 | Pan et al. ..................... 385/24 |
| 5,737,104 A | | 4/1998 | Lee et al. ..................... 359/124 |
| 5,768,458 A | | 6/1998 | Ro et al. ........................ 385/79 |
| 5,796,889 A | | 8/1998 | Xu et al. ........................ 385/24 |
| 5,799,121 A | | 8/1998 | Duck et al. .................... 385/47 |
| 5,812,307 A | | 9/1998 | Naganuma ................. 359/341 |
| 5,822,478 A | | 10/1998 | Kim ............................. 385/33 |
| 5,859,940 A | | 1/1999 | Takahashi et al. ............ 385/34 |
| 5,917,626 A | | 6/1999 | Lee ............................. 359/131 |
| 6,084,994 A | | 7/2000 | Li et al. ........................ 385/31 |
| 6,168,319 B1 | | 1/2001 | Francis ........................ 385/79 |

OTHER PUBLICATIONS

Tomlinson, W.J.; *Applications of GRIN-rod lenses in optical fiber communication systems*; Applied Optics; vol. 19, No. 7; Apr. 1, 1980, pp. 1127–1138.

\* cited by examiner

*Primary Examiner*—John D. Lee
(74) *Attorney, Agent, or Firm*—Philip G. Alden

(57) ABSTRACT

A method for making an optical collimating device having three or more ports. A test light having the same wavelength as that at which the filter is designed to operate is transmitted through the input collimator. The angle of incidence is measured, and the location where the reflected beam reaches the ferrule is determined. The data dictates where the output fiber pigtail should be positioned within the ferrule to achieve the measured angle of incidence for that transmitted wavelength and the spacing between input and output pigtails based on the angle of reflection. Multiple ferrules containing two or more pigtails corresponding to a particular filter operating at a particular wavelength are segregated into separate collimator bins that are marked accordingly.

12 Claims, 9 Drawing Sheets

METHOD OF MAKING AN OPTICAL FIBER COLLIMATING DEVICE

RELATED APPLICATIONS

This application claims the benefit of U.S. Provisional Application, Ser. No. 60/193,712, filed Mar. 31, 2000 entitled APPARATUS AND METHOD OF MAKING AN OPTICAL FIBER COLLIMATING DEVICE, which is hereby incorporated by reference.

FIELD OF THE INVENTION

The present invention relates to optical fiber telecommunication systems and, in particular, to an apparatus and method of manufacturing optical filtering devices employed in such telecommunication systems.

BACKGROUND INFORMATION

Figure 1:
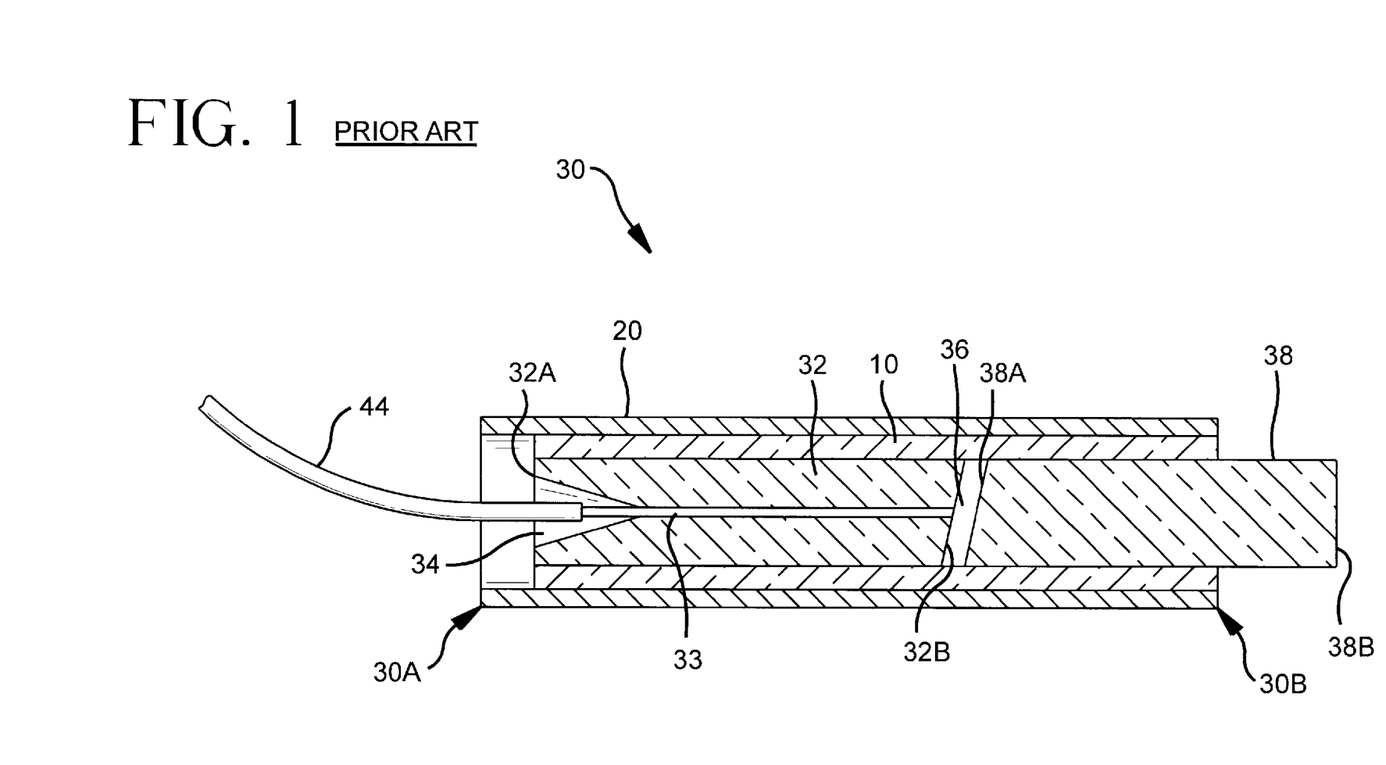
FIG. 1 is a cross-sectional side view of a prior art one-port collimator subassembly.

An optical fiber used in an optical device, such as a wavelength-division multiplexing/demultiplexing (WDM) device in a telecommunication network is typically held in an optical collimator subassembly, which facilitates the alignment and collimation of a multi-wavelength light beam being transmitted through the optical fiber. The collimated light beam exiting the optical fiber is optically transmitted to some type of an optical component, such as, an optical filter or an optical isolator or a grating element in the optical device. The specific type of optical component coupled to the output side of the collimator depends on the specific application. For instance, a WDM device of an optical amplifier system employs optical filters that are precisely aligned and coupled with such collimators in the system. A problem with coupling a light beam into an optical fiber of an optical component in a WDM device is that the light passing through the fiber and emanating from an output end of the fiber immediately begins to disperse, thus, resulting in considerable light signal losses. Accordingly, in order to avoid significant signal loss and to promote maximum signal transfer of an optical signal from one optical fiber to another optical fiber of an optical device or system, a collimating lens is provided, usually at the output end of each optical fiber. A collimator subassembly can have any number of optical ports. The term "ports" refers to the total number of optical fiber pigtails contained within a particular optical collimator subassembly. For instance, a one-port collimator subassembly (shown in FIG. 1) has a total of one optical fiber pigtail, whereas, a two-port/dual-port optical collimator subassembly has a total of two optical fiber pigtails, and further, a three-port optical collimator subassembly has a total of three optical fiber pigtails and so on. Similarly, the term "multiple-port" refers to a collimator subassembly having two or more optical fiber pigtails. Typically, a one-port collimator subassembly comprises a glass ferrule or tube, which is disposed at an input end of an insulating glass tube. The ferrule includes an optical fiber pigtail, where a stripped end of the optical fiber is disposed within an axial channel of the ferrule. The collimator subassembly further includes a collimating lens that collimates the light emitted from the optical fiber into parallel rays. The collimating lens is disposed at an opposite output end of the insulating glass tube, adjacent to an output end of the ferrule. A slight gap is left between the output end of the ferrule and an input end of the collimating lens. The output end faces of both the optical fiber pigtail and the ferrule are cleaved, ground and polished at a predetermined angle to prevent back reflections along the optical axis. A type of collimating lens employed in a collimator subassembly is a GRaded-INdex (GRIN) lens, where often the GRIN lens is a cylindrical piece of optical glass with a length that is longer than its diameter. Moreover, the GRIN lens is fabricated to have a radially varying index of refraction that is greater towards the center of the GRIN lens, thus, the GRIN lens is able to produce a focusing effect similar to that of a convex lens. The GRIN lens collimates the light diverging from (or focuses the light to) the smaller core of the optical fiber pigtail held within the ferrule.

The construction of a two-port collimator subassembly is the same as that of a one-port collimator subassembly, except that there are two optical fiber pigtails disposed within the ferrule. An end of each of the fiber pigtails is stripped and is disposed within the ferrule, such that one of the fiber pigtails is aligned in a parallel position to the other fiber pigtail within the ferrule. Similarly, the construction of a three-port collimator subassembly has a ferrule that holds an exposed end of three optical fiber pigtails, with each of the fiber pigtails being disposed within the ferrule, such that each of the fiber pigtails is aligned in a parallel position with respect to the other two fiber pigtails within the ferrule. In this fashion, a variety of single collimator subassemblies having one or more ports can be constructed for a particular application.

Often, such single collimator subassemblies are combined to form an optical filtering device for use in a larger optical system, such as, a wavelength-division multiplexing/demultiplexing (WDM) system. Basically, in a filtering device, an optical component, such as an optical filter is mounted onto a holder and is positioned in between the two collimator subassemblies. The two single collimator subassemblies chosen to construct the filtering device can each have either one-port or multiple ports. Further, the form, function, and placement of the optical component in the filtering device can be selected based upon the particular application of the filtering device. In particular, the optical element can be selected from a group consisting of: an interference filter, a dichroic filter, a thin-film filter, an isolator, a circulator, a gain-flattening filter, a narrow-band filter, a wide-band filter, a passband filter, a band-stripping filter, a grating element, a reflective element, a refractive element, a diffractive element, a liquid-crystal element and an active optical element.

Figure 2:
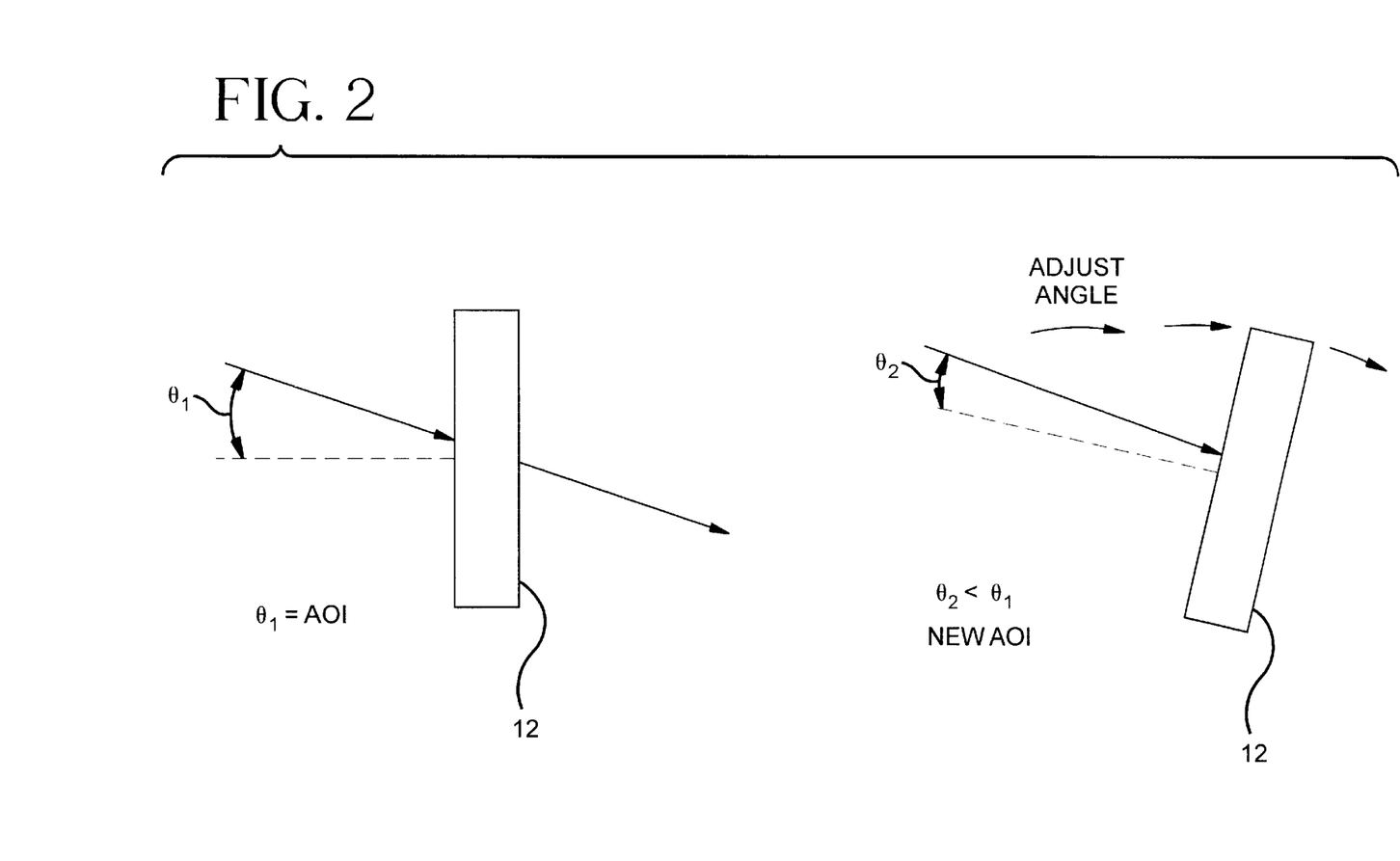
FIG. 2 is a schematic view showing the difference in the angles of incidence of a signal hitting the geometric center of a filter that is parallel with a vertical versus a filter that has a slight tilt with respect to a vertical axis.
Figure 3:
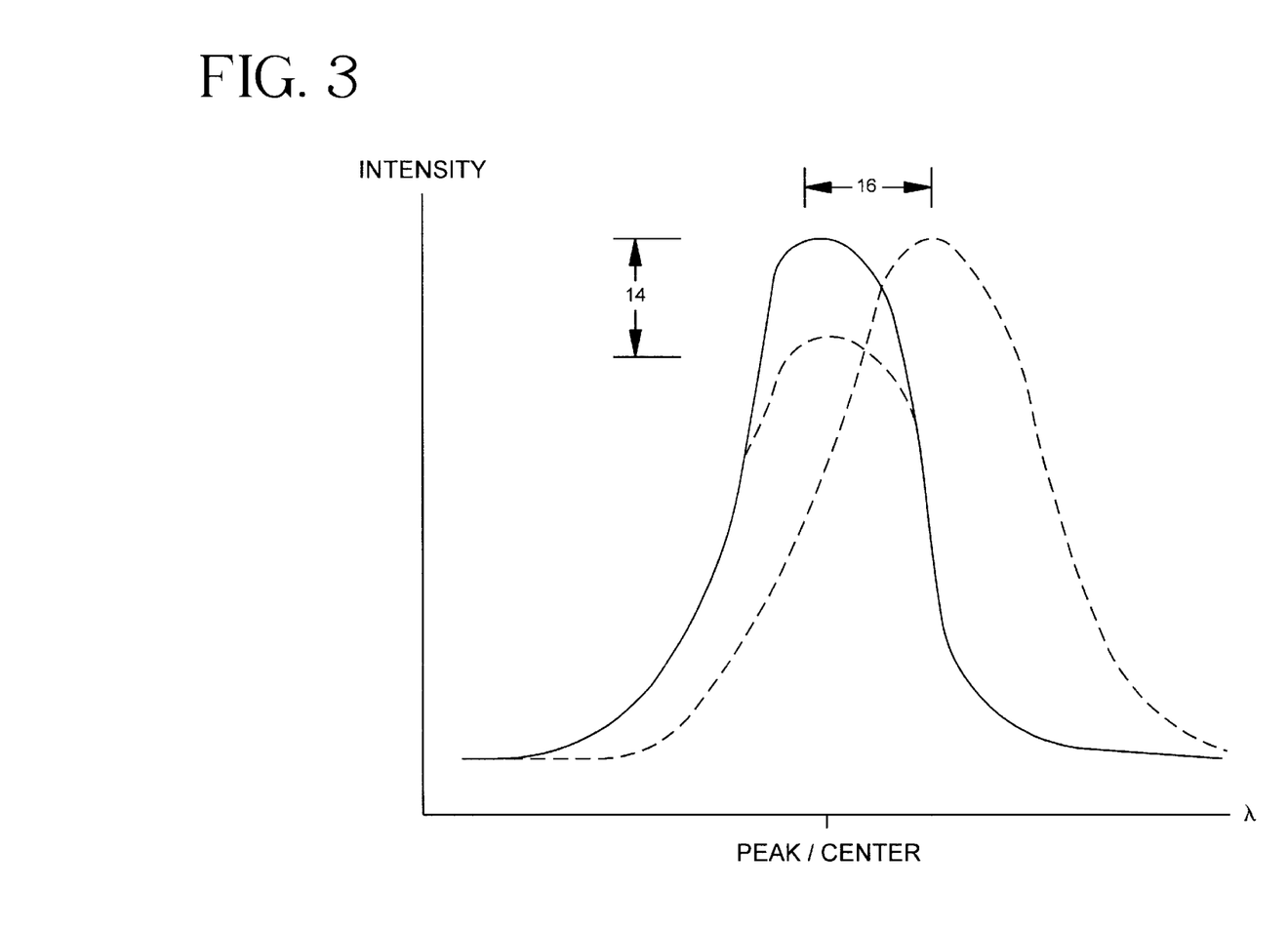
FIG. 3 is a schematic view showing the relationship between the angle of incidence and the intensity of a signal being transmitted and the peak center wavelength of the respective filters shown in FIG. 2.

The wavelength of light passed by each filter is highly sensitive to two parameters: 1) the angle of incidence between the filter surface and the light beam, and 2) the position of the beam on the filter's surface. Hence, the angle at which an optical filter is mounted within such a dual collimator assembly is critical, since the intensity of the signal being transmitted by a filter at a desired wavelength will depend on the position of the signal beam on the filter surface, that is, whether or not the signal beam hits the geometric center of the filter at the specific angle of incidence (AOI). The wavelength that is transmitted through the filter depends on the optical path length traveled by an optical beam through the filter. Moreover, the optical path length depends on the physical thickness of the filter material and the index of refraction of the filter material. When the AOI is varied slightly (as shown in FIGS. 2 and 3), the filter may increase or decrease the intensity of the signal being transmitted at the desired wavelength. Also, as a filter's AOI is adjusted or varied, the "peak" of the wavelength or the center of the wavelength pulse being transmitted may shift slightly up or down the spectrum, thus, the particular filter may pass a different wavelength than the wavelength at which the center of the filter was characterized. Accordingly, if the AOI is changed, then the intensity may shift, the peak wavelength may shift, or both may shift. At a new AOI, there may be a different peak wavelength at which the maximum intensity of light is transmitted. Thus, each filter can be characterized as having a preferred AOI at which it will transmit a maximum intensity of light at a predetermined center wavelength.

When a WDM device is assembled, all the filters are pre-selected to have compatible properties for the wavelengths being transmitted or reflected. The filters function as a "kit", that is, each of the filters operates at one common angle of incidence at each filter's geometric center point. Traditionally, in a filtering device, the respective filters are mounted onto associated holders and the filter and holder are manually tilted, that is, the filters are manually aligned with the collimator subassemblies as a light signal is transmitted through the device, until an optimal angle of incidence (AOI) is achieved, where a collimated beam of the light signal hits the geometric center of the optical filter. The filter and holder are then bonded or soldered (secured) into place. As such, the assembly process is long, tedious, labor-intensive and, consequently, overall expensive. It also requires that each of the collimator subassemblies already be assembled and "tuned" for the proper alignment of the light going through an output port. A significant problem arises with this process when considering three-port filtering devices. When the AOI of the filter is adjusted or changed, the angle of reflection also changes. Moreover, the change in the angle of reflection dictates where the reflected light signal will hit the ferrule and, therefore, where the bore hole for the output fiber should be located on the input collimator subassembly. Additionally, it is not feasible to manufacture optical filters having a precise AOI, since the multiple dielectric layers of film are not optically flat and can have different configurations.

In light of the foregoing, it is desirable to simplify the manufacturing process for collimator subassemblies and for optical filtering devices and, also, increase line production and reliability with minimal rework. Further, it is desirable to provide a multiple-port collimator subassembly and method for making the multiple-port collimator subassembly that can be easily employed in filtering devices for making a variety of optical multiplexing devices. In addition, it is desirable to provide a manufacturing process that is relatively cost-effective.

DESCRIPTION OF THE PREFERRED EMBODIMENTS

Figure 5:
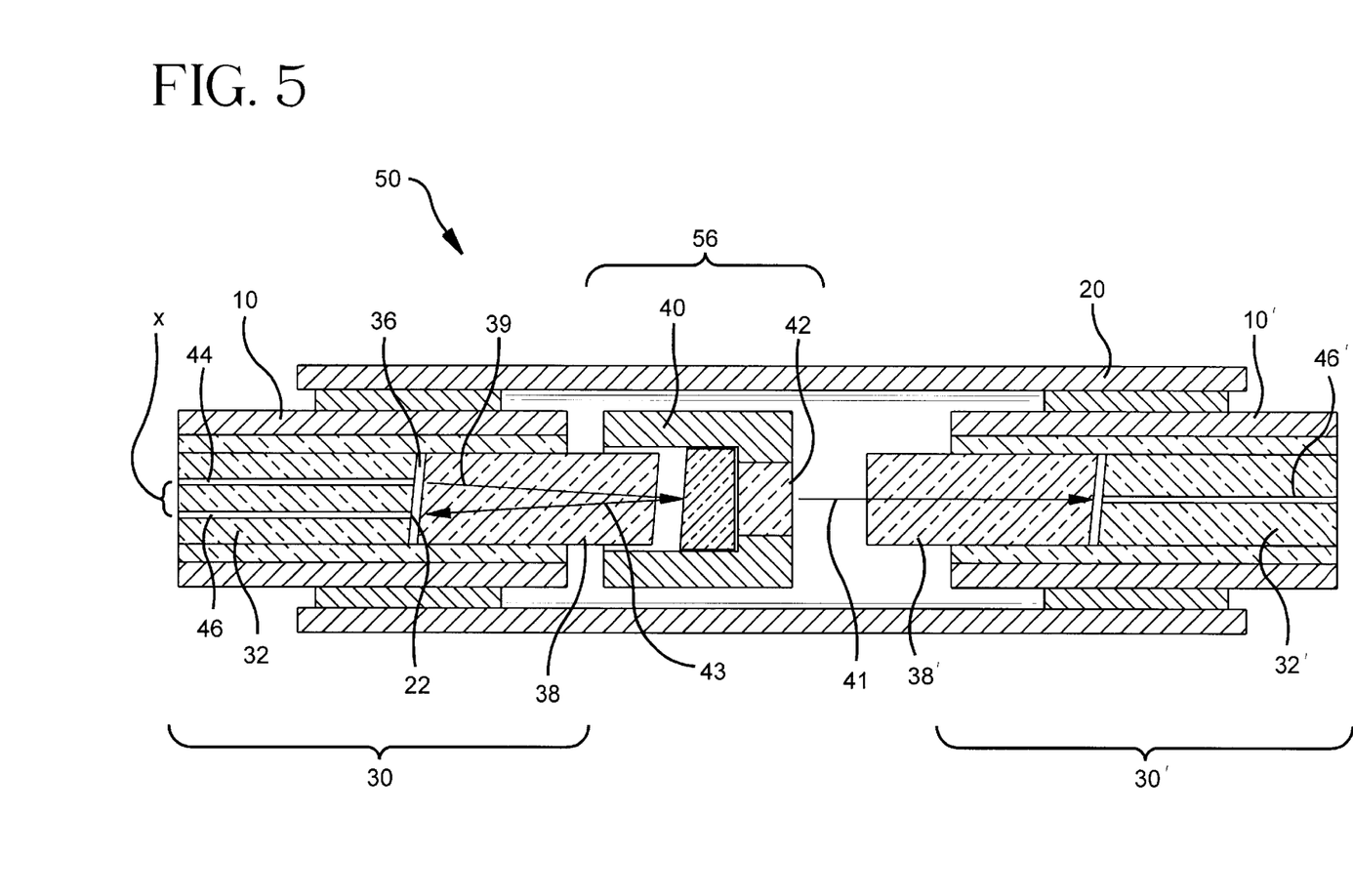
FIG. 5 is a cross-sectional side view of a three-port filtering device fabricated in accordance with the present invention.

The invention disclosed herein generally provides a method of making an optical filtering device for use in a larger optical system, such as a wavelength division multiplexing/demultiplexing (WDM) assembly. In particular, the invention discloses an optical filtering device 50 (shown in FIG. 5) comprised of dual optical collimator subassemblies having an optical filtering component 42 sandwiched in between. Although, the description will discuss the manufacture of a three-port optical filtering device 50, the invention provides a method for making an optical filtering device 50 having any desired number N of optical ports, where $N \geq 2$. As used herein, the term "wavelength-division multiplexing assembly" refers to an opto-electronic device that can serve as either a multiplexer or a demultiplexer. When functioning as a multiplexer, the optical multiplexing assembly combines or multiplexes two or more optical signals having different wavelengths into a "combined" signal and simultaneously transmits the combined signal in the same direction and over the same optical fiber. On the other hand, when functioning as a demultiplexer, the optical multiplexing assembly separates or demultiplexes the different optical signals by wavelength and delivers each signal to a particular location. The description will for the most part discuss the manufacture of an optical filtering device 50 for use demultiplexing system. However, those skilled in the art will readily understand the correlative functionality of a filtering device in a multiplexer assembly. Furthermore, the term "input collimator subassembly" refers to a collimator subassembly 30 (shown in FIG. 5) that is located at the input end of the filtering device, whereas, the term "output collimator subassembly" refers to a second collimator subassembly 30' (shown in FIG. 5) that is located at the output end of the filtering device 50. In addition, the term "fiber-ferrule" refers to a ferrule having an optical fiber pigtail that is secured in an axial position within the ferrule. Furthermore, the term "filter-holder unit" refers to a holder 40 having an optical filter 42 securely mounted thereon (as can be seen in FIG. 2).

Accordingly, in a broad aspect, the invention provides a method of making an optical filtering device 50 having N optical ports, where $N \geq 2$. In general, a plurality of filters are selected from a "kit", where each of the filters is designed to operate at substantially the same angle of incidence. Preferably, each of the filters is made up of a multi-layered dielectric film or refractive film coating that is deposited on a glass substrate. The coating filters out a predetermined wavelength band of light and passes the remaining desired wavelengths of the incident light along through the glass substrate. Each of the filters is secured to a metal holder forming a filter-holder unit, where the coated surface of the filter is bonded to the inside of the holder surface. The holder is preferably made from a relatively moderate expansion material, such as stainless steel. A low elastic modulus and high thermal expansion silicone adhesive is preferably used to minimize the mismatch stresses in the bond between the glass filter and the metal holder.

In the inventive manufacturing process, a filter-holder unit, where an optical filter 42 has already been bonded to a holder 40 is optically aligned in series with a prefabricated collimator subassembly 30. The collimator subassembly 30 comprises an insulated glass tube 10, a ferrule 32, a collimating lens 38 and an input optical fiber pigtail. The input optical fiber pigtail is disposed axially within a capillary in the ferrule 32, and the collimating lens 38 is optically aligned proximate to and in series with an output end of the ferrule 32. The ferrule 32 is disposed within and at a first end of the insulated tube 10, whereas, the collimating lens 38 is partially disposed within and at a second end of the insulated tube 10. Both the filter-holder unit and the collimator subassembly 30 are mounted on to individual fixtures that allow for axial positioning. The optical filter 42 that is bonded to the holder 40 is selected from a filter kit, where each filter in the kit is designed to operate at a specific desired wavelength and has the same specific angle of incidence. Further, the pre-fabricated collimator subassembly 30 is positioned at an input end of the filter-holder unit, hence, referred to as an input collimator subassembly 30. In particular, an output end of the collimating lens 38 is disposed within an input end of the filter-holder unit, and a test light having the same wavelength as that at which the filter is designed to operate is transmitted through the input optical fiber of the collimator subassembly 30. In addition, a second collimator subassembly 30', which is also mounted on to a fixture, is positioned at an output end of the filter-holder unit, hence, referred to as an output collimator subassembly 30'. The output collimator subassembly 30' is similar in construction to the input collimator subassembly 30. However, the output collimator subassembly 30' is positioned at the output end of the filter-holder unit such that the collimating lens 38 is proximate to the filter-holder unit and such that a transmitted beam of the test light passing through the filter hits the core of the output optical fiber in the second collimator subassembly 30'. The angle of incidence, namely, the angle that a collimated beam of the test light through the collimating lens 38 makes with the geometric center of the filter is measured. In particular, the angle that is measured is the angle at which the filter transmits a maximum amount of the collimated beam having a specific wavelength. The measured angle of incidence in turn defines the angle of reflection, that is, the angle that a reflected beam portion of the test light makes with an output end of the ferrule 32 of the input collimator subassembly 30. As such, the location where the reflected beam portion of the test light hits the ferrule 32 is noted, so that the distance/spacing between the input fiber pigtail 44 and the location where the reflected beam portion of the test light hits the ferrule 32 can be precisely measured. The measured distance/spacing dictates where the output fiber pigtail 46 should be axially positioned within the ferrule 32 to achieve the measured angle of incidence for a particular filter transmitting light at a particular wavelength. This process is repeated for each of the filters in the kit, where the angle of incidence that the test light makes with the geometric center of each of the filters is measured. Each of the filters whose angle of incidence has been measured is placed in one of several filter bins, where each bin is marked to identify the filters as having a specific center wavelength and a specific angle of incidence. In addition, the spacing between the input fiber and the location where the reflected beam portion of the test light hits the ferrule 32 is recorded for each of the different angles of incidence for the filters in the kit. Accordingly, the distance/spacing on the ferrule 32 that is measured and recorded is used to fabricate multiple groups of ferrules containing dual-fibers, where each group has a ferrule 32 with a specific spacing between an input fiber pigtail 44 and an output fiber pigtail 46 that corresponds to a particular filter that has been tested. Preferably, the output fiber pigtail 46 is disposed within a second capillary in the ferrule 32, such that the input and output fiber pigtails 44 and 46, respectively, are substantially parallel to each other. Each of the fabricated groups of ferrules are incorporated into input collimator subassemblies and are segregated in separate input collimator bins that are marked to identify the collimator subassemblies as having a specific spacing between the input and output fiber pigtails 44 and 46 as corresponding to a specific angle of incidence. The "input" designation signifies that the collimator subassembly 30 is designed to be assembled at the input end of an optical filter 42 device. Moreover, the collimator subassemblies 30' designed for the output end of a three-port filtering device are placed in bins that are marked as containing single-fiber output collimators for use in a three-port filtering device. The process identified for fabricating input collimator subassemblies can be used to fabricate output collimator subassemblies for use in a four-port filtering device. In particular, only a certain wavelength of the reflected beam portion of the test light that hits the output end of a ferrule 32 of an input collimator subassembly 30 will be transmitted through the optical fiber, while the remainder of the test light will bounce back through the filter and to a location on the input end of a ferrule 32 of an output collimator subassembly 30'. The distance between the output fiber pigtail 46 and the location where the remainder portion of the test light hits the ferrule 32 of the output collimator subassembly 30' is recorded for each of the filters in the kit. This distance is used to fabricate multiple groups of ferrules that are incorporated in output collimator subassemblies, where each group has a specific spacing between a first output fiber pigtail 46 and a second output fiber pigtail 46 corresponding to a particular filter that has been tested. Again, each of the dual-fiber output collimator subassemblies are separated into output collimator bins, where each bin is marked as containing dual-fiber output collimator subassemblies for use in four-port filtering devices and as having a specific distance between the two optical fiber pigtails that corresponds to a filter having a specific center wavelength and a specific angle of incidence.

In this manner, either a three-port or a four-port filtering device can be assembled where an optical filter 42 having a specific angle of incidence is selected for use in a particular wavelength-division multiplexing/ demultiplexing (WDM) system, and an input collimator subassembly 30 having the appropriate spacing between the input fiber pigtail 44 and the output fiber pigtail 46 is selected from a corresponding input collimator bin to match the chosen filter. Further, an appropriate output collimator subassembly 30' is selected from either a corresponding single-fiber or dual-fiber output collimator bin. Basically, the collimating lens 38 of the input collimator subassembly 30 is optically aligned and secured, preferably with an adhesive, within an input end of the filter-holder unit. The input collimator subassembly is disposed within a metal housing 20 and the filter-holder unit is optically aligned and secured with respect to the input collimator subassembly 30 such that the optical alignments are maintained. Similarly, the output collimator subassembly 30' is optically aligned at the output end of the filter-holder unit within the metal housing 20.

Figure 4:
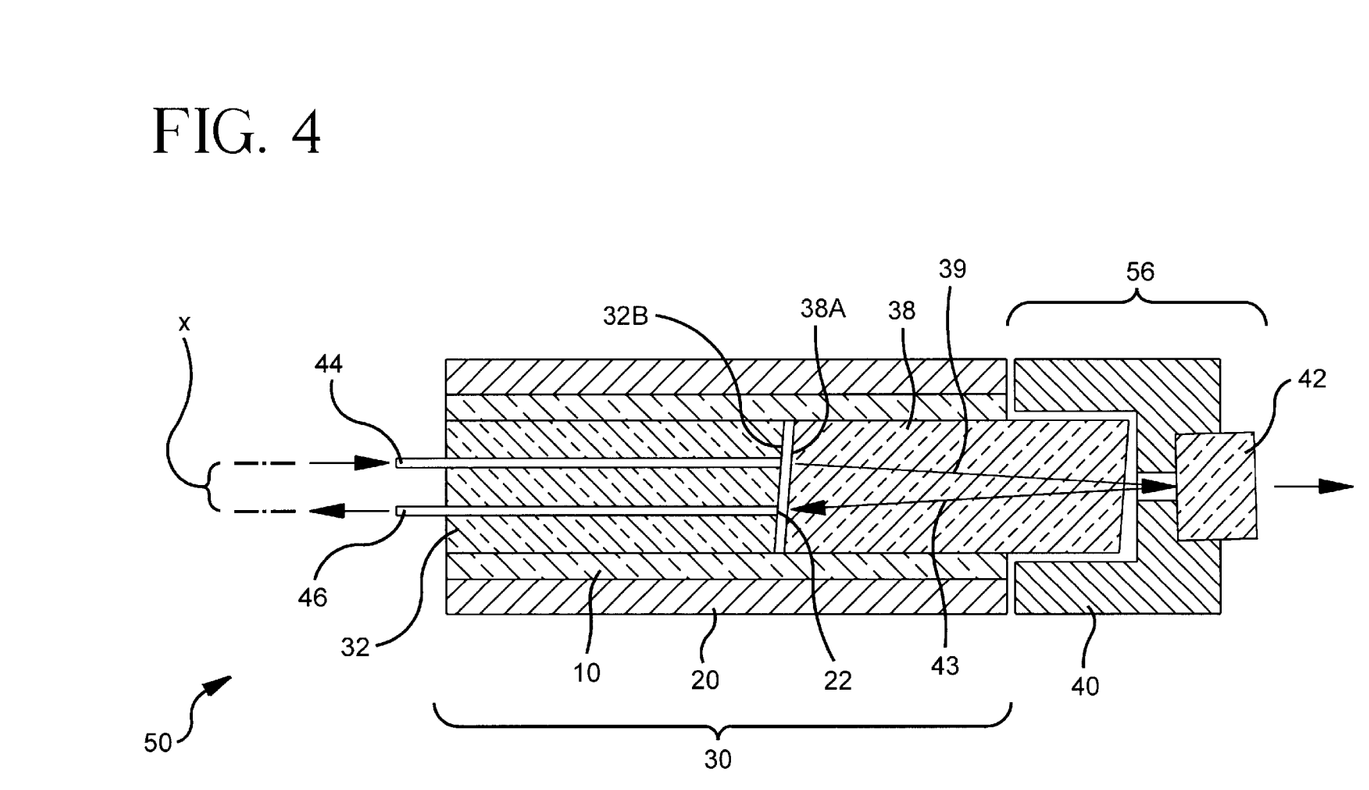
FIG. 4 is a cross-sectional side view of a single two-port collimator subassembly that is optically aligned with a filter-holder fabricated in accordance with the present invention.
Figure 6:
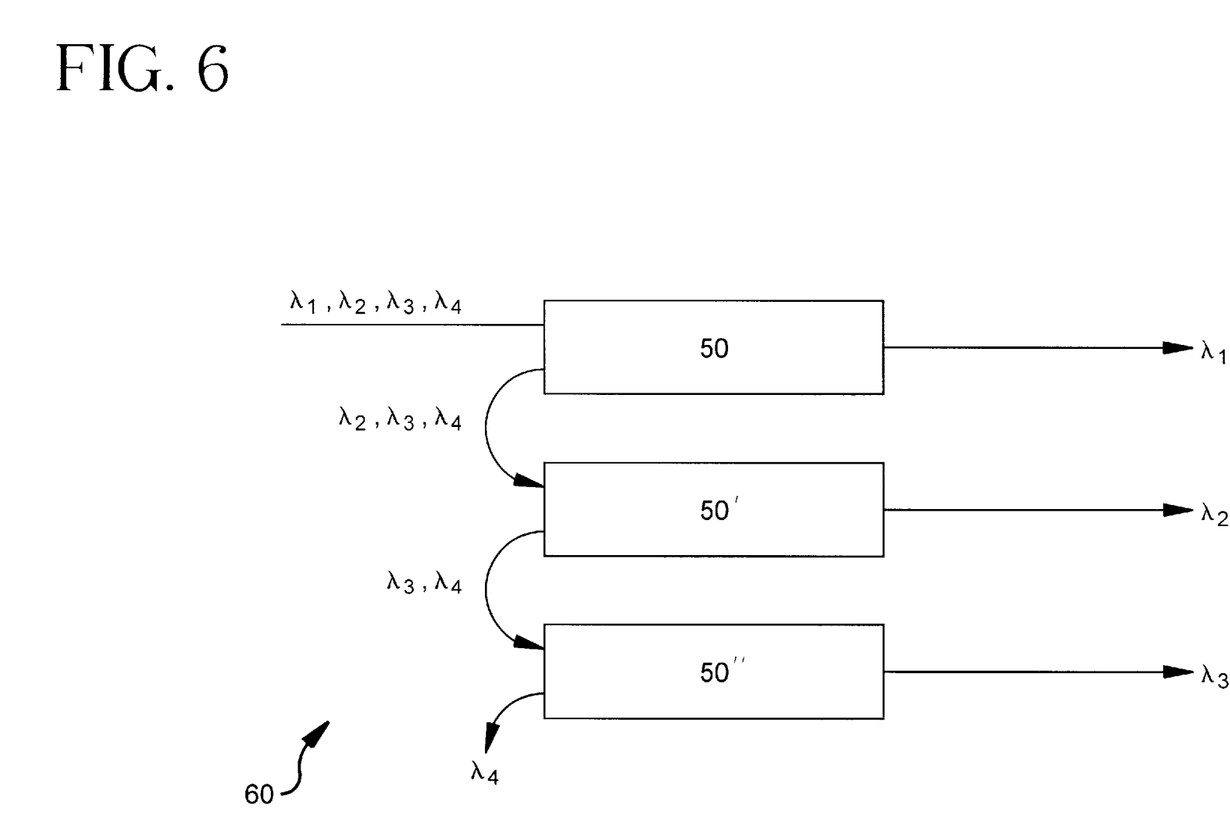
FIG. 6 is a schematic view of several filtering devices cascaded together to form a wavelength-division multiplexing/demultiplexing (WDM) device in accordance with the present invention.
Figure 7:
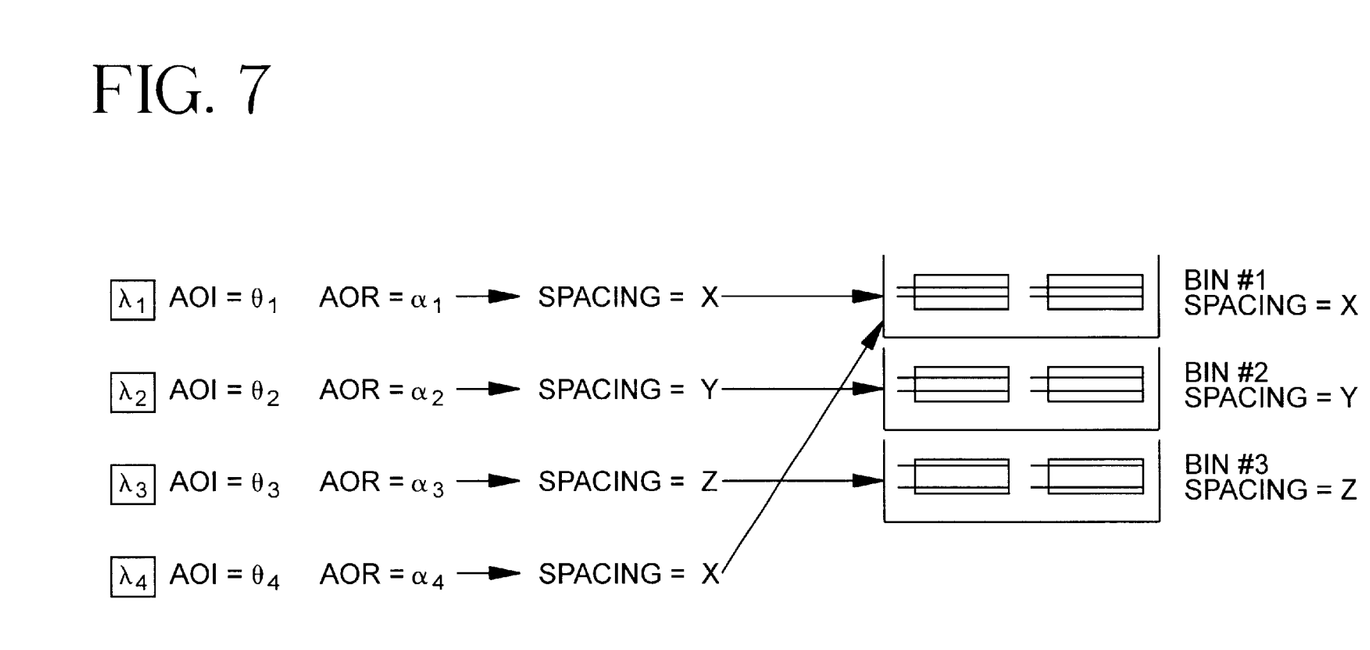
FIG. 7 is a schematic representation of the binning process of manufacturing collimator subassemblies in accordance with the present invention.
Figure 8A:
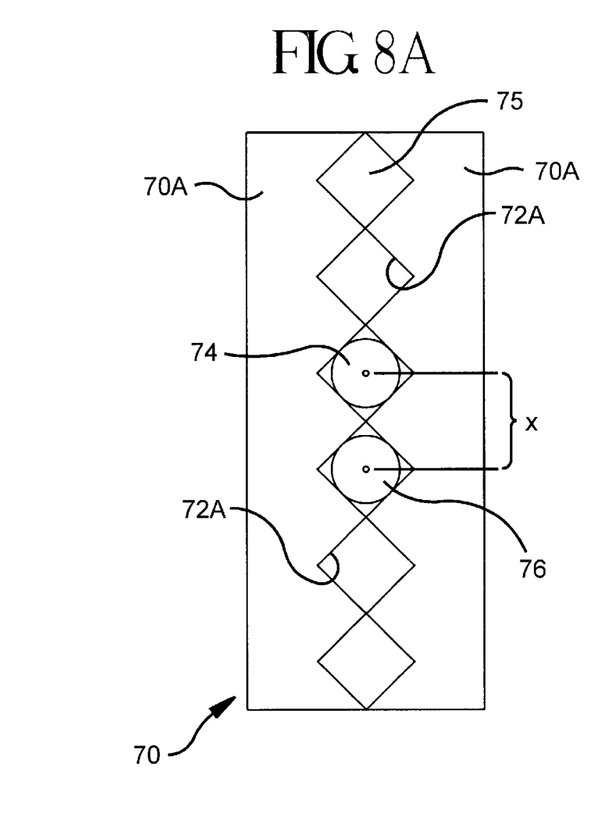
FIG. 8A is a cross-sectional axial view of one embodiment of a ferrule of the present invention that has a fiber spacing/distance X between two optical fiber pigtails made in accordance with the present invention.
Figure 8B:
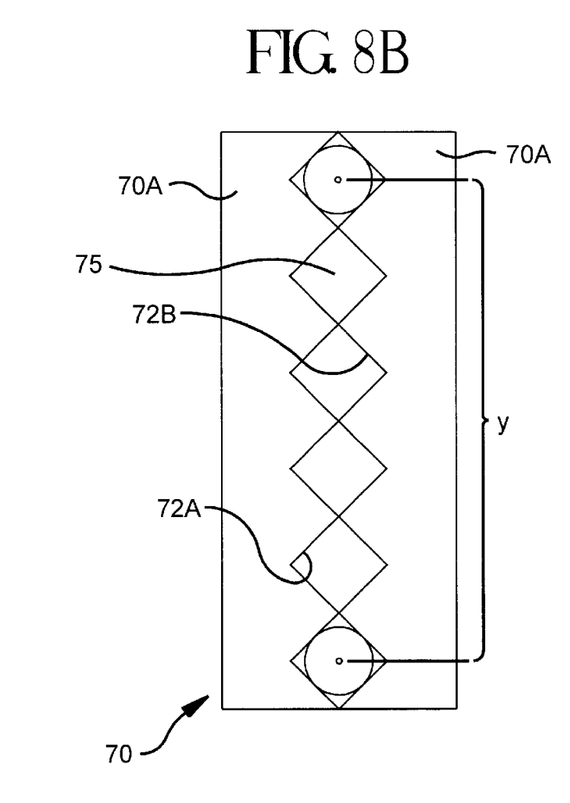
FIG. 8B is a cross-sectional axial view of one embodiment of a ferrule of the present invention having another fiber spacing/distance Y between two optical fiber pigtails made in accordance with the present invention.
Figure 9:
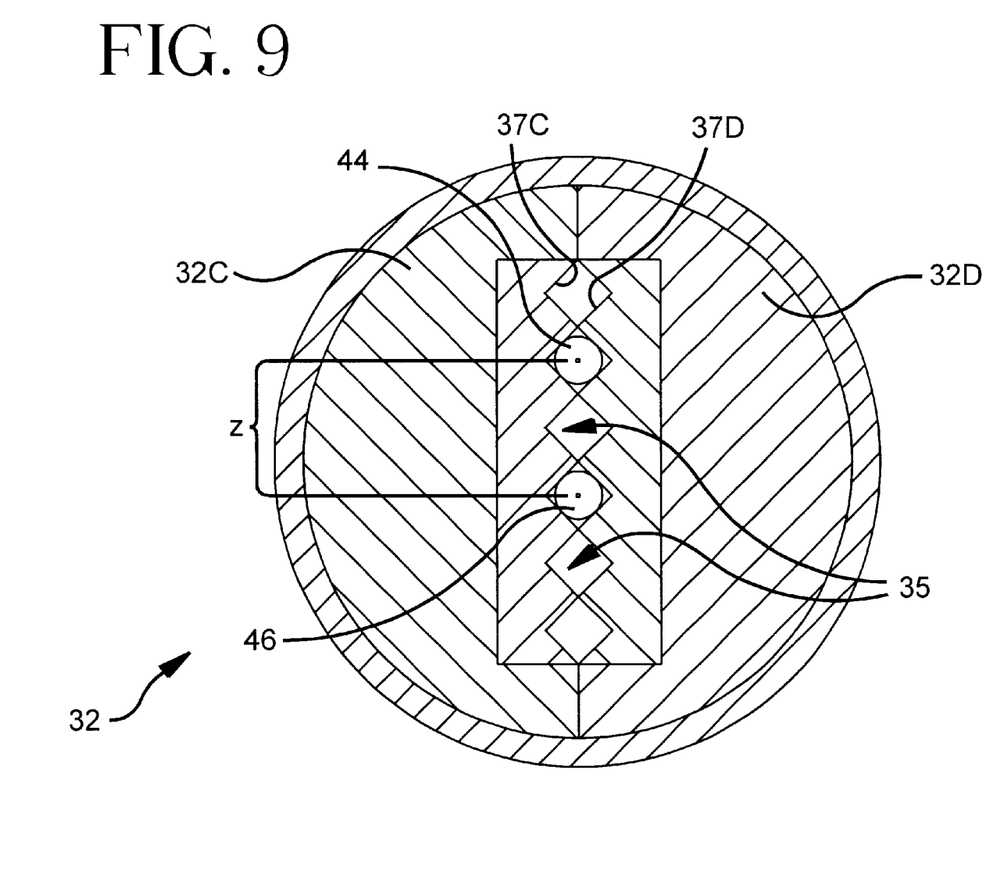
FIG. 9 is a cross-sectional axial view of another embodiment of a ferrule for providing several different fiber spacing/distances between two optical fiber pigtails made in accordance with the present invention.

Referring to FIG. 4, an input collimator subassembly 30 having two optical fiber pigtails that are disposed within a single ferrule 32 is shown optically aligned with a filter-holder unit. One of the two fiber pigtails in the input collimator subassembly 30 functions as an input fiber for transmitting an incoming transmission signal and the other functions as an output fiber pigtail 46 for transmitting an outgoing signal. The way that this specific three-port dual collimator assembly operates is that the input fiber pigtail 44 is optically coupled to a fiber-optic carrier that transmits ("passes") a multi-wavelength signal to the input fiber pigtail 44 of the first collimator subassembly 30. The first collimator subassembly 30 collimates the multi-wavelength signal into a single collimated beam of light that is directed to a geometric center of the optical filter 42 positioned in between the two collimator subassemblies. The optical filter 42 transmits a wavelength/channel of the collimated beam on to the fiber pigtail of the second collimator subassembly 30', which transmits the signal on to an associated fiber-optic carrier, and the filter reflects ("bounces") all other wavelengths in a reflected beam of light that is directed toward the output fiber pigtail 46 of the first collimator subassembly 30, where the reflected beam of light is transmitted to a fiber-optic carrier associated with the output fiber pigtail 46. In this manner, a plurality of the dual collimator assemblies can be cascaded together (as shown in FIG. 6) to design a more complex WDM device. Thus, by characterizing the filters for their AOI at certain predetermined center wavelengths, which in turn defines the angle of reflection (AOR), an appropriate dual-fiber input collimator subassembly 30 having the correct fiber spacing determined by the AOR can be selected for making a dual collimator assembly.

In another aspect, the invention provides a ferrule 32 for use in a multiple-port collimator subassembly. The ferrule 32 is comprised of two mating halves, which together define a ferrule 32 that has a plurality of channels traversing the length of the ferrule 32. In particular, each half has a plurality of concave grooves along the inner surface that mate with a plurality of concave grooves on the other half of the ferrule 32. When the two mating halves are locked together, each of the concave grooves defines a respective one of the plurality of channels of the ferrule 32. In a preferred embodiment, the concave grooves are v-shaped. Alternatively, the concave grooves can be u-shaped. In a preferred embodiment, the spacing between the concave grooves defines the possible spacing increments between the dual optical fiber pigtails in a collimator subassembly 30. This permits the fibers to be spaced at the desired distances, with the precision defined by the number and spacing of the concave grooves, so that spacings may be achieved at different multiples or a multiple plus a fraction of the optical fiber diameter. The greater the number of concave grooves, the greater the precision in selecting the spacing. Each ferrule 32 having a different number of concave grooves or a different spacing of the concave grooves can be separated in separate bins and marked accordingly.

In yet another embodiment, the invention provides a collimator subassembly 30 comprising an insulated tube 10 having a first end and an opposite second end, a ferrule 32 disposed within and proximate to the first end of the tube 10 and a collimating lens 38 partially disposed within and proximate to the second end of the tube 10, the ferrule 32 being separated from the collimating lens 38 by a gap 36. The ferrule 32 is made up of two mating halves, which together define a plurality of channels traversing the length of the ferrule 32. In particular, each of the mating halves has a plurality of concave grooves along the inner surface that mate with a plurality of concave grooves on the other half of the ferrule 32. When the two mating halves are locked together, each of the concave grooves defines a respective one of the plurality of channels of the ferrule 32. Further, an input optical fiber pigtail is disposed within one of the plurality of channels and an output optical fiber pigtail is disposed within a second one of the plurality of channels, the input fiber pigtail 44 being separated a distance from the output fiber pigtail 46, where the distance corresponds to a specific angle of incidence that a light signal makes with an optical filter 42 having a specific center wavelength. In a preferred embodiment, the output end of the ferrule 32 has a tilt of a predetermined angle, and the input end of the collimating lens 38 has a tilt that matches the tilt of the output end of the ferrule 32, such that the insertion losses of the transmitted light and the reflected light are minimized.

In yet another aspect, the invention provides a four-port optical filter 42 device comprising a housing 20, an input collimator subassembly 30, an optical filter 42 and an output collimator subassembly 30', where the optical filter 42 is positioned in between the input and output collimator subassemblies and where the input collimator subassembly 30 is secured at an input end of the housing 20 and the output collimator subassembly 30' is secured at an output end of the housing 20. The input collimator subassembly 30 further comprises an insulated tube 10 having a first end and an opposite second end, the insulated tube 10 being disposed within the housing 20, a ferrule 32 disposed within and proximate to the first end of the tube 10 and a collimating lens 38 partially disposed within and proximate to the second end of the tube 10, the ferrule 32 being separated from the collimating lens 38 by a gap 36. The ferrule 32 is made up of two mating halves, which together define a plurality of channels traversing the length of the ferrule 32. In particular, each of the mating halves has a plurality of concave grooves along the inner surface that mate with a plurality of concave grooves on the other half of the ferrule 32. When the two mating halves are locked together, each of the concave grooves defines a respective one of the plurality of channels of the ferrule 32. Further, a first optical fiber pigtail is disposed within one of the plurality of channels and a second optical fiber pigtail is disposed within a second one of the plurality of channels, the first fiber pigtail being separated a distance from the second fiber pigtail, where the distance corresponds to a specific angle of incidence that a light signal makes with a filter having a specific center wavelength. The distance between the end of the fiber pigtails and the end surface of the collimating lens 38, which is determined by the ferrule 32 position, is crucial for collimation. Once the distance has been set, the optical fiber pigtails and the collimating lens 38 are secured within the tube 10 to maintain the desired collimation. The fixed displacement between the optical fiber pigtails and the collimator lens 38 in the input collimator subassembly 30 should preferably provide an optically well-characterized collimated beam of light, and should result in minimum insertion loss between the collimator subassembly 30 and an input end of another optical component in an optical system, namely, the optical filter 42. The output collimator subassembly 30' is similar in construction to the input collimator subassembly 30. The output end of the collimating lens 38 of the input collimator subassembly 30 is secured within a holder 40, which also has mounted, at an opposite end from the lens 38, the optical filter 42. Further, the collimating lens 38 of the output collimator subassembly 30' is optically aligned and positioned proximate to the optical filter 42. In a preferred embodiment, the respective opposing surfaces of the ferrule 32 and the collimating lens 38 in both the input and output collimator subassemblies have a matching tilt of a predetermined angle, such that the insertion losses of the transmitted light and the reflected light are minimized. Also, in a preferred embodiment, the end of the optical fiber pigtails within the ferrule 32 facing the filter have an end that form a parallel surface with the end surface of the ferrule 32.

Although a preferred embodiment of this invention has been described herein, various modifications and variations of the invention will be apparent to those skilled in the art without departing from the spirit or scope of the invention. For instance, an optical collimator having N number of optical ports can be constructed in accordance with the invention described herein, where N≧2. Furthermore, a ferrule can be designed that allows the spacing between the input and output fibers to be adjusted, such as by rotating a two-part elliptical ferrule to change the spacing between the fibers. Thus, it is intended that the present invention cover the modifications and variations of this invention provided they come within the scope of the appended claims and their equivalents.

What is claimed is:

1. A method of making an optical filtering device having a ferrule, an input fiber pigtail disposed axially within the ferrule, an output fiber pigtail having a core, an optical filter having a surface and a characteristic optical transmission property dependent upon the angle of incidence upon the optical filter, a collimating lens having an output end, a filter-holder unit defining a lens cavity, and an insulated tube having a first end and a second end, the method comprising the steps of:

optically aligning the collimating lens proximate to and in series with the output end of the ferrule, the ferrule being disposed within the first end of the insulated tube, the collimating lens being at least partially disposed within the second end of the insulated tube;

radially centering the output end of the collimating lens within the lens cavity of the filter-holder unit;

transmitting a test light beam through the input fiber pigtail;

adjusting the position of the filter-holder unit to achieve a desired angle of incidence of the test light beam upon the surface of the optical filter, the desired angle of incidence being determined by the characteristic optical transmission property of the optical filter;

determining an angle of reflection of the test light beam reflected by the optical filter based upon the desired angle of incidence;

disposing the output fiber pigtail within the ferrule such that the output fiber pigtail is spaced a distance apart from the input fiber pigtail, and such that the test light beam reflected by the optical filter at the angle of reflection towards the output fiber pigtail is incident upon the core of the output fiber pigtail; and securing the output fiber pigtail and the filter-holder unit in position to maintain the desired angle of incidence and the angle of reflection for the optical filtering device.

2. The method of claim 1 wherein the step of adjusting the filter-holder unit includes the step of:

measuring the angle of incidence that the test light beam makes relative to the surface of the optical filter.

3. The method of claim 1 wherein the ferrule has an end facing towards the collimating lens and the optical filter, the input fiber pigtail is received within a first capillary defined by the ferrule, and the step of disposing the output fiber pigtail within the ferrule includes the steps of:

determining a precise location where the reflected test light beam is incident upon the end of the ferrule facing towards the collimating lens and the optical filter;

providing a second capillary defined by the ferrule, the second capillary being oriented substantially parallel with and spaced apart the distance from the first capillary, the second capillary being positioned at the precise location where the reflected test light beam is incident upon the end of the ferrule, the output fiber pigtail being received within the second capillary such that the reflected test light beam is incident upon the core.

4. A method of making a collimator subassembly for an optical filtering device having a ferrule defining a first capillary and an output end, an insulated tube having a first end and a second end, an input fiber pigtail, an output fiber pigtail, a collimating lens, the method comprising the steps of:

disposing the ferrule within the first end of the insulated tube, the ferrule receiving the input fiber pigtail within the first capillary;

at least partially disposing the collimating lens within the second end of the insulated tube, the collimating lens being in series and optically aligned with the output end of the ferrule, the ferrule and the collimating lens being separated by an air gap within the insulated tube;

providing a second capillary spaced a distance apart from the first capillary at a location where a reflected portion of a test light strikes the output end of the ferrule; and disposing the output fiber pigtail within the second capillary of the ferrule.

5. A method of assembling a plurality of three-port filtering devices for filtering optical signals composed of at least two wavelengths of signal light, each of the plurality of three-port filtering devices having an optical filter which passes a transmitted wavelength of the signal light and reflects a reflected wavelength of the signal light, an input fiber pigtail, a first output fiber pigtail receiving the transmitted wavelength, and a second output fiber pigtail receiving the reflected wavelength, an input ferrule and an output ferrule, the input ferrule defining a first capillary and a second capillary, the input fiber pigtail and the second output fiber pigtail being received within the input ferrule, the output ferrule defining a third capillary, the first output fiber being received within the third capillary, and the optical filter having a characteristic optical transmission property dependent upon the angle of incidence of the transmitted wavelength upon the optical filter, the method comprising the steps of:

selecting a first optical filter having a desired transmitted wavelength from a plurality of optical filters having different characteristic optical transmission properties dependent upon the respective angle of incidence of the transmitted wavelength upon each of the plurality of optical filters;

determining a position for the input fiber pigtail within the ferrule to provide the desired angle of incidence for the transmitted wavelength upon the optical filter;

determining an angle of reflection for the reflected wavelength based upon the desired angle of incidence for the transmitted wavelength upon the optical filter;

selecting a first input ferrule corresponding to the first optical filter from a plurality of input ferrules each having a different spacing between the first capillary and the second capillary, the first input ferrule corresponding to the first optical filter having a predetermined spacing between the first capillary and the second capillary appropriate for use with the first optical filter based upon the position of the input fiber pigtail within the first input ferrule, the angle of incidence of the transmitted wavelength, and the angle of reflection of the reflected wavelength from the first optical filter;

selecting a first output ferrule from a plurality of output ferrules, the first output ferrule having a predetermined position of the third capillary appropriate for use with the first optical filter based upon the position of the input fiber pigtail within the first input ferrule and the angle of incidence of the transmitted wavelength upon and passing through the first optical filter;

precisely mounting each of the first input ferrule, the optical filter, and the first output ferrule within a housing to form a first three-port filtering device; and repeating the steps of the method to fabricate subsequent three-port filtering devices wherein the characteristic optical transmission property dependent upon the respective angle of incidence of the transmitted wavelength of the corresponding subsequent optical filter and the predetermined spacing between the first capillary and the second capillary of the input ferrule are different than that of the first three-port filtering device.

6. The method of claim 5 wherein the step of selecting the first optical filter includes the steps of:

providing a plurality of optical filter elements each designed to pass a specific transmitted wavelength contained within the signal light;

measuring a preferred angle of incidence for each of the plurality of optical filter elements at which a maximum intensity of the specific transmitted wavelength of the signal light at the specific transmitted wavelength passes through the optical filter elements;

characterizing each of the plurality of optical filter elements based upon the specific transmitted wavelength and the preferred angle of incidence corresponding to each of the plurality of optical filter elements; and selecting the first optical filter from the plurality of optical filter elements based upon the specific transmitted wavelength and the preferred angle of incidence.

7. The method of claim 5 wherein the three-port filtering device includes a collimating lens disposed between the input ferrule and the optical filter, and wherein the step of selecting the first input ferrule includes the steps of:

providing a ferrule having the input fiber disposed within the first capillary of the ferrule;

optically aligning the collimating lens with the ferrule;

positioning the first optical filter proximate to the collimating lens and opposing the ferrule;

transmitting a test light beam having the transmitted wavelength through the input fiber pigtail and through the collimating lens;

adjusting the position of the first optical filter to achieve the preferred angle of incidence for the transmitted wavelength incident upon the optical filter; and disposing the second output fiber pigtail a specified distance from the input fiber pigtail within the ferrule such that the second output fiber pigtail receives the reflected wavelength.

8. The method of claim 7 wherein the step of disposing the second output fiber pigtail a specified distance from the input fiber pigtail includes the steps of:

identifying the location where the reflected wavelength of the test light beam is incident upon the ferrule; and making the second capillary at the location such that the reflected wavelength is incident upon the second output fiber pigtail.

9. The method of claim 8 further comprising the steps of:

identifying the optical filter as having the preferred angle of incidence at the transmitted wavelength; and identifying the ferrule as having the first capillary and the second capillary spaced apart the specified distance which corresponds to the optical filter having the preferred angle of incidence.

10. The method of claim 9 wherein the step of identifying the optical filter includes the step of:

placing the optical filter in one of a plurality of filter bins with a plurality of like optical filters, the preferred angle of incidence or the transmitted wavelength or both for each of the like filters being different than for the optical filters in the remaining ones of the plurality of filter bins.

11. The method of claim 9 wherein the step of identifying the ferrule includes the step of:

placing the ferrule in one of a plurality of input ferrule bins with a plurality of like input ferrules, the spacing between the first capillary and the second capillary for each of the like input ferrules being different than for the ferrules in the remaining ones of the plurality of ferrule bins.

12. A method of making an optical filtering device having a ferrule, an input fiber pigtail disposed within the ferrule, an output fiber pigtail having a core, a reflective element having a surface, a holder for the reflective element, a collimating lens, and a filter element having a characteristic optical transmission property dependent upon the wavelength of the incident signal light and the angle of incidence upon the filter element, the method comprising the steps of:

optically aligning the collimating lens proximate to and in series with the output end of the ferrule;

positioning the output end of the collimating lens relative to the holder for the reflective element;

transmitting a test light beam through the input fiber pigtail such that it is incident on the surface of the reflective element;

adjusting the position of the filter-holder unit to achieve a desired angle of incidence that the test light beam makes with the surface of the reflective surface, the desired angle of incidence being determined by the characteristic optical transmission property of the filter element for the wavelength of the incident signal light;

determining an angle of reflection of the test light beam reflected by the reflective element based upon the desired angle of incidence;

disposing the output fiber pigtail within the ferrule such that the output fiber pigtail is spaced a distance apart from the input fiber pigtail, and such that the test light beam reflected by the reflective element at the angle of reflection is incident upon the core of the output fiber pigtail; and securing the output fiber pigtail or the holder or both in position to maintain the desired angle of incidence and the angle of reflection for the filter element having the characteristic optical transmission property for the wavelength of the incident signal light.

* * * * *